(12) United States Patent
Ware

(10) Patent No.: US 10,333,424 B2
(45) Date of Patent: Jun. 25, 2019

(54) OFFLINE POWER SUPPLY

(75) Inventor: Gary R. Ware, Newton, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 852 days.

(21) Appl. No.: 14/375,644

(22) PCT Filed: Feb. 1, 2012

(86) PCT No.: PCT/US2012/023465
§ 371 (c)(1),
(2), (4) Date: Jul. 30, 2014

(87) PCT Pub. No.: WO2013/115814
PCT Pub. Date: Aug. 8, 2013

(65) Prior Publication Data
US 2015/0003130 A1   Jan. 1, 2015

(51) Int. Cl.
*H02M 7/06* (2006.01)
*H02M 7/217* (2006.01)
(Continued)

(52) U.S. Cl.
CPC ............ *H02M 7/217* (2013.01); *H02M 3/156* (2013.01); *H02M 7/06* (2013.01); *H02M 7/2176* (2013.01);
(Continued)

(58) Field of Classification Search
CPC ........ H02M 3/156; H02M 7/06; H02M 7/217; H02M 2001/0032; H02M 2001/007; H02M 2001/4291; H02M 7/2176; Y02B 70/16
(Continued)

(56) References Cited

U.S. PATENT DOCUMENTS

| 4,943,902 A | 7/1990 | Severinsky |
| 5,134,355 A | 7/1992 | Hastings |

(Continued)

FOREIGN PATENT DOCUMENTS

| CN | 101114152 A | 1/2008 |
| CN | 101414789 A | 4/2009 |
| CN | 101656467 A | 2/2010 |

OTHER PUBLICATIONS

Extended European Search Report from corresponding European Application No. 12867050.2 dated Nov. 18, 2015.
(Continued)

*Primary Examiner* — Jeffrey A Gblende
*Assistant Examiner* — Lorena Bruner
(74) *Attorney, Agent, or Firm* — Lando & Anastasi, LLP

(57) ABSTRACT

According to one aspect, embodiments of the invention provide a power supply system comprising an input line configured to receive input AC power, a rectifier having an input coupled to the input line and an output, a switch having a first end coupled to the output of the rectifier and a second end selectively coupled to an inductor, a capacitor coupled to the inductor, and control circuitry coupled to the inductor and the capacitor, wherein the control circuitry is configured to control the switch to selectively couple the output of the rectifier to the inductor to generate a first DC power level, operate in a first mode of operation while receiving the first DC power level, detect a phase angle of the rectified AC power, and transition into a second mode of operation in response to detection of the phase angle.

20 Claims, 3 Drawing Sheets

(51) Int. Cl.
*H02M 3/156* (2006.01)
*H02M 1/00* (2006.01)

(52) U.S. Cl.
CPC ............... *H02M 2001/007* (2013.01); *H02M 2001/0032* (2013.01); *Y02B 70/16* (2013.01)

(58) Field of Classification Search
USPC .......................................................... 363/89
See application file for complete search history.

(56) References Cited

U.S. PATENT DOCUMENTS

| | | | |
|---|---|---|---|
| 5,235,504 A * | 8/1993 | Sood | H02M 1/4208 323/224 |
| 7,295,452 B1 * | 11/2007 | Liu | G05F 1/70 323/235 |
| 7,564,706 B1 * | 7/2009 | Herbert | G05F 1/70 323/222 |
| 8,077,488 B2 | 12/2011 | Tamaki | |
| 8,278,900 B2 * | 10/2012 | Strijker | H02M 1/4225 323/284 |
| 8,494,390 B2 | 7/2013 | Shin | |
| 2003/0090244 A1 | 5/2003 | Shenai et al. | |
| 2003/0234636 A1 | 12/2003 | Ruan et al. | |
| 2005/0276082 A1 * | 12/2005 | Panda | H02M 1/4216 363/70 |
| 2006/0139020 A1 | 6/2006 | Wood et al. | |
| 2006/0285366 A1 * | 12/2006 | Radecker | H02M 3/33507 363/16 |
| 2007/0036212 A1 | 2/2007 | Leung et al. | |
| 2008/0024107 A1 * | 1/2008 | Shin | G03G 15/2039 323/319 |
| 2008/0265680 A1 | 10/2008 | Marwali et al. | |
| 2009/0195063 A1 | 8/2009 | Joseph et al. | |
| 2009/0256534 A1 | 10/2009 | Videtich et al. | |
| 2010/0110730 A1 * | 5/2010 | Ger | H02M 1/4225 363/15 |
| 2011/0080144 A1 * | 4/2011 | Hua | H02J 7/041 323/210 |
| 2011/0122662 A1 * | 5/2011 | Li | H02M 1/32 363/49 |
| 2011/0271131 A1 * | 11/2011 | Lefebvre | G06F 1/26 713/323 |
| 2013/0141001 A1 * | 6/2013 | Datta | H05B 33/0809 315/224 |
| 2014/0104952 A1 * | 4/2014 | Takeuchi | G11C 16/06 365/185.17 |

OTHER PUBLICATIONS

Notification of Transmittal of the International Search Report and the Written Opinion of the International Searching Authority from corresponding PCT/US2012/023465 dated Jun. 5, 2012.

* cited by examiner

OFFLINE POWER SUPPLY

This application is a U.S. National Stage Application and claims priority under 35 U.S.C. § 371 of International Application No. PCT/US2012/023465, filed Feb. 1, 2012, which is hereby incorporated herein by reference in its entirety.

BACKGROUND OF INVENTION

Field of the Invention

At least one example in accordance with the present invention relates generally to providing a low-voltage power supply to a low-power device.

Discussion of Related Art

In the home automation and energy efficiency market, the demand for "Smart Outlets" and other intelligent power products that are more cost and energy efficient is quickly growing. For example, such "Smart Outlets" may prevent the flow of energy to an outlet when it detects that a device coupled to the outlet has gone into standby mode. Additionally, a plurality of "Smart Outlets" may also be networked together to more efficiently control the distribution of power to the plurality of outlets.

SUMMARY OF THE INVENTION

Aspects in accord with the present invention are directed to a power supply system comprising an input line configured to receive input AC power, a rectifier having an input coupled to the input line and an output, a switch having a first end coupled to the output of the rectifier and a second end selectively coupled to an inductor, a capacitor coupled to the inductor, and control circuitry coupled to the inductor and the capacitor, wherein the control circuitry is configured to control the switch to selectively couple the output of the rectifier to the inductor to generate a first DC power level, operate in a first mode of operation while receiving the first DC power level, detect a phase angle of the rectified AC power, and transition into a second mode of operation in response to detection of the phase angle.

According to one embodiment, the control circuitry is further configured to operate in the second mode of operation while receiving a second DC power level from the capacitor. In another embodiment, the first mode of operation is an active mode of operation and the second mode of operation is a standby mode of operation, and wherein the first DC power level is greater than the second DC power level.

According to another embodiment, the control circuitry includes a processor coupled to the inductor and the capacitor and a controller coupled to the switch and the capacitor. In one embodiment, the processor is configured to place selected processor tasks on hold in the standby mode of operation. In another embodiment, the power supply system further comprises a zero-crossing flag line coupled to the processor and configured to detect the phase angle of the rectified AC power. In another embodiment, the switch is controlled by the controller to selectively couple the output of the rectifier to the inductor to provide voltage pulses to the inductor.

According to one embodiment, the switch is a Field Effect Transistor. In one embodiment, the switch is operated by the control circuitry at a switching frequency in the range of 5 MHz-20 MHz. In another embodiment, the inductor has a value in the range of 10 uH-500 uH. In one embodiment, the capacitor has a value in the range of 1 nF to 10 μF.

According to one embodiment, the rectifier, switch, inductor, and control circuitry are integrated within a single chip.

Another aspects in accord with the present invention is directed to a method for providing DC power to a processor coupled to an AC input line, the method comprising receiving input AC power from an AC power source coupled to the AC input line, rectifying the input AC power to generate rectified AC power, generating a first DC power level from the rectified AC power by selectively coupling the rectified AC power to an inductor, providing the first DC power level to a capacitor and the processor and operating the processor in a first mode of operation, detecting a phase angle of the rectified AC power, and transitioning the processor into a second mode of operation in response to detection of the phase angle.

According to one embodiment, transitioning the processor into a second mode of operation includes transitioning the processor into a standby mode of operation and discharging the capacitor to provide, in the second mode of operation, a second DC power level to the processor which is less than the first DC power level. In one embodiment, the method further comprises placing selected processor tasks on hold while the processor is in the standby mode of operation.

According to another embodiment, detecting includes monitoring a zero crossing flag line coupled to the processor and determining a zero-crossing window corresponding to a phase angle range of the rectified AC power that includes a phase angle at which the rectified AC power has a zero voltage value. In one embodiment, the method further comprises transitioning the processor into the first mode of operation in response to a determination that the zero-crossing window has passed.

According to one embodiment, generating includes selectively coupling the rectified AC power to the inductor using a control signal having a fixed frequency and a duty cycle that varies with variations in the phase angle. In one embodiment, selectively coupling the rectified AC power to the inductor includes controlling the switch using the control signal to provide voltage pulses to the inductor from the rectified AC power.

Aspects in accord with the present invention are also directed to a processor system comprising an input line configured to receive input AC power, the input AC power having a cyclical waveform including a portion at which a voltage of the waveform is less than a threshold voltage, a processor configured to operate from DC power derived from the input AC power, and means for detecting the voltage of the waveform, and controlling the processor to operate in a first mode of operation upon detection that the voltage is greater than the voltage threshold and for operating in a second mode of operation upon detection that the voltage is equal to or less than the voltage threshold.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1:
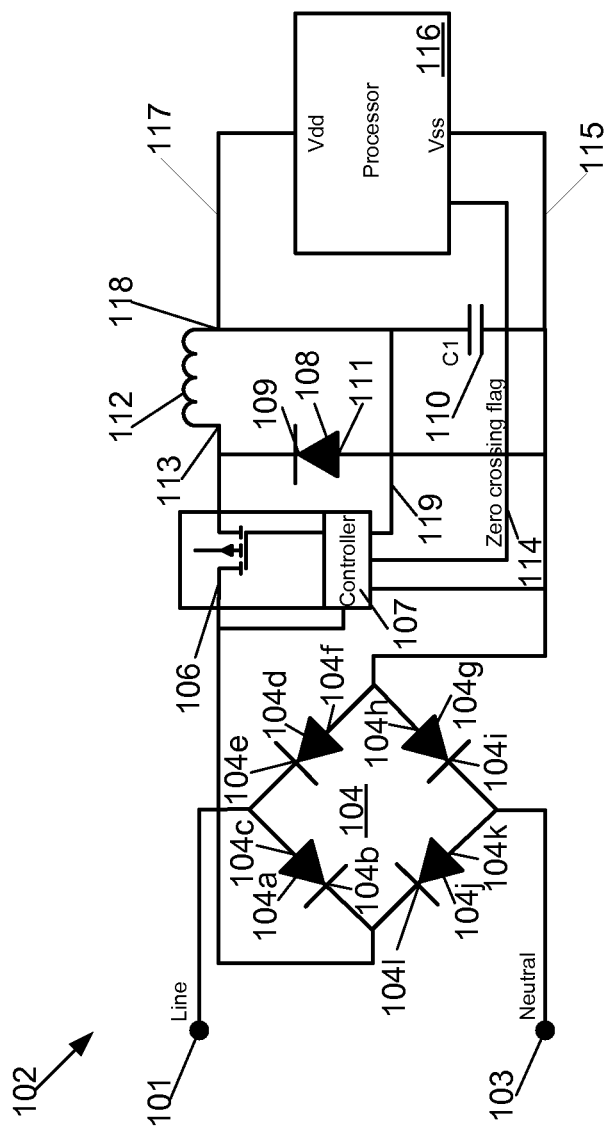
FIG. 1 is a circuit diagram illustrating a power supply system in accordance with aspects of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, "Smart Outlets" and other intelligent power products are commonly used to improve cost and efficiency. A "Smart Outlet" often includes an embedded processor which is configured to monitor and control the outlet. The embedded processor is typically coupled to AC mains which provides power to the outlet. However, running the embedded processor off of the AC line while minimizing the impact on the power provided to the outlet may require that the embedded processor be a low-power processor. For example, an embedded low-power processor may receive a low supply voltage from a low-voltage power supply coupled to the AC line. Generating such a low-voltage supply from the AC line typically calls for the use of a high-voltage input capacitor and a high-capacitance output capacitor within the low-voltage supply, both of which are relatively large. The low-voltage power supply may also include additional components (e.g., diodes, inductors, a controller Integrated Circuit (IC), transistors, resistors, capacitors, etc.) which also occupy valuable space and cause the supply to be expensive.

At least some embodiments described herein provide a lower-cost and smaller-size low-voltage power supply design that may eliminate the need for an input capacitor and reduce the size of other components within the power supply.

FIG. 1 is a circuit diagram of a power supply system 102 in accordance with one embodiment. The power supply system 102 is coupled to the AC line and neutral inputs 101, 103 and includes control circuitry which is configured to operate the power supply system 102. In one embodiment, the control circuitry includes a processor 116 and a switch controller 107.

The power supply system 102 also includes a bridge rectifier 104. The bridge rectifier 104 is coupled to the AC line 101 and neutral line 103 inputs and includes a plurality of diodes (first 104a, second 104d, third 104g, and fourth 104j). The anode 104c of the first diode 104a and the cathode 104e of the second diode 104d are both coupled to the AC line input 101. The anode 104k of the fourth diode 104j and the cathode 104i of the third diode 104g are both coupled to the AC neutral line 103. The anode 104f of the second diode 104d and the anode 104h of the third diode 104g are both coupled to the processor 116 via a negative supply line 115. The cathode 104b of the first diode 104a and the cathode 104l of the fourth diode 105j are both coupled to a switch 106.

The switch 106 is also coupled to an input 113 of an inductor 112 and the switch controller 107. According to one embodiment, the switch 106 is a single high speed, high voltage transistor (e.g., a Field-Effect Transistor (FET)). However in other embodiments, the switch 106 may be any other type of high speed, high voltage transistor (e.g., a Gallium Nitride transistor or a Silicon Carbide transistor). Also in other embodiments, any number of high speed, high voltage transistors may be utilized in the switch 106.

The switch controller 107 is coupled to the negative supply line 115 and to the cathode 104b of the first diode 104a. The switch controller 107 is also coupled to the positive supply line 117 via a feedback line 119. According to one embodiment, the switch controller 107 includes a comparator.

An output 118 of the inductor 112 is coupled to the processor 116 via a positive supply line 117. According to one embodiment, the inductor 112 is relatively small. For example, in one embodiment, the inductor 112 has a value of 100 uH (assuming a clock speed of >10 MHz). However, in other embodiments, the inductor 112 may be of any appropriate size.

According to one embodiment, the processor 116 is a low-power processor. For example, in one embodiment, the processor 116 has power requirements of 2.0-3.6V, an active current requirement of about 10 mA and a standby (or sleep) current requirement of about 1 µA. However, in other embodiments, the processor 116 may have different power requirements.

A fifth diode 108 is coupled across the power supply system 102. The cathode 109 of the fifth diode 108 is coupled to the switch 106 and the input 113 of the inductor 112 and the anode 111 of the fifth diode 111 is coupled to the negative supply line 115.

An output capacitor 110 is coupled between the positive supply line 117 and the negative supply line 115. According to one embodiment, the output capacitor 110 is relatively small. For example, in one embodiment, the output capacitor 110 has a value of about 5 nF. However, in other embodiments, the output capacitor 110 may be of any appropriate size.

According to one embodiment, the power supply system 102 also includes a zero-crossing flag line 114 which is coupled between the switch 106 and the processor 116.

AC power provided to the bridge rectifier 104, via the AC line input 101, is rectified and full-wave rectified power is provided to the switch 106. According to one embodiment, the voltage received by the switch 106 from the AC line input 101 via the bridge rectifier 104 ranges from 0V to 354V. To drop a relatively high voltage (e.g., 354V) to a level appropriate for the low-power processor 116 (e.g., to 3.3 VDC), the switch 106 is opened and closed by the switch controller 107, based on the voltage on the positive supply line 117 sensed via the feedback line 119, to drive the inductor 112 to provide the appropriate level of voltage to the processor 116.

When the switch 106 is closed, voltage from the switch 106 (i.e. from the received rectified power) drives the inductor 112 to charge the capacitor 110 and provide voltage to the positive supply line 117 of the processor 116. As the inductor 112 is relatively small (e.g., 100 uH), to avoid inductor saturation the switch 106 is opened and closed rapidly by the switch controller 107 to produce narrow voltage pulses (i.e. narrow portions of the rectified power received by the switch 106). The narrow voltage pulses drive the inductor 112 for short periods of time, producing the desired voltage on the positive supply line 117 to power the processor 116, while preventing inductor saturation.

When the switch 106 is opened, the voltage at the input 113 of the inductor 113 moves negative until the fifth diode 108 turns on and the energy previously stored on the inductor 112 is provided to the output capacitor 110. According to one embodiment, as the processor 116 continuously draws power from the output capacitor 110, the supply voltage may sag.

As the values of the inductor 112 and output capacitor 110 are relatively small, the storage capacities of the inductor 112 and output capacitor 110 may be limited. Thus, near the zero-crossing of the rectified power received by the switch 106, when the voltage pulses provided from the switch 106 to the inductor 112 go to zero, the energy stored on the inductor 112 and the output capacitor 110 may not be at a sufficient level to fully power the processor 116 alone (e.g., at 3.3 VDC and 10 mA). As a result, certain processor tasks may potentially be interrupted.

According to one embodiment, to avoid the interruption of processor tasks when energy stored on the inductor 112 and output capacitor 110 is insufficient to fully power the processor 116 in an active state (i.e. around the zero-crossing of the rectified power received by the switch 106), the processor 116 monitors the received rectified power at the switch 106 for approaching zero-crossings (e.g., via the zero-crossing flag line 114). For example, in one embodiment, the processor 116 determines a phase angle at which a zero-crossing of the rectified power is approaching. The processor 116 then monitors the rectified power (e.g., via the zero-crossing flag line 114) for that phase angle (i.e., the phase angle indicating to the processor 116 that a zero-crossing of the rectified power is approaching). The indication of an approaching zero-crossing does not necessarily mean that the rectified power has or will cross zero, but only that the rectified power is approaching, or has reached, zero. In other embodiments, any appropriate method for identifying an approaching zero-crossing may be utilized.

When the processor 116 senses an approaching zero-crossing, the processor 116 transitions to a standby (or sleep) state until the zero-crossing window (i.e., when the zero-crossing is present) has passed. By entering a standby state, the processor requires a lower amount of power (than the active state) to maintain the state of the processor 116 and the lower amount of power may be successfully supplied by the output capacitor 110 and the inductor 112 around the zero-crossings. While the processor 116 is in a standby state (i.e. during the zero-crossing window), certain processor tasks which cannot be interrupted (e.g., radio communications or sensor readings) are put on hold until the zero-crossing window has passed.

For example, while operating in an active state, the processor 116 monitors the received rectified power at the switch 106 for approaching zero-crossings. Upon sensing an approaching zero crossing via the zero-crossing flag line 114, the processor 116 transitions to a standby (or sleep) state to avoid interruption of a processor task. According to one embodiment, in the standby state the processor 116 requires 1 μA and at least 2V to maintain the state of the processor during the zero-crossing window (as opposed to 10 mA and 3.3V when the processor is in an active state). In one embodiment, an output capacitor 110 of 5 nF has sufficient capacity (charged while the processor 116 is in an active state) to maintain the state of the processor 116, when the processor 116 is in a standby state, with only 34 mV of voltage sag and at 50 Hz, the zero-crossing time is about 170 uS.

In other embodiments, where the standby and/or active power requirements of the processor are different, the values of the output capacitor 110 and inductor 112 may be designed differently to provide the appropriate storage capacity capable of powering the processor 116 in standby mode during a zero-crossing window.

Once the processor 116 determines that the zero-crossing window has passed, the processor 116 is powered into an active state with power from the inductor 112 (driven by voltage pulses from the switch 106). In one embodiment, the zero-crossing window (i.e. when the processor 116 is in standby mode and unable to perform certain tasks) is 170 μS (i.e. about 3 degrees wide out of a 180 degree line cycle or 1.7% of the entire line cycle); however, in other embodiments, the zero-crossing window may be different depending on the rectified power provided to the switch 106. In one embodiment, the task window (i.e. the period in which the processor can perform tasks without interruption) is 10 mS.

According to one embodiment, certain processor tasks are unable to be fully performed within the designated task window. For example, certain wireless personal area network implementations (i.e. technology utilizing the IEEE 802.15.4 standard such as ZigBee) may require more than the exemplary 10 mS task window discussed above. For instance, according to one embodiment, a ZigBee communication may be performed in 5 mS, but initial network joining requires 15 mS. In such a situation, techniques for granularizing the network join process (i.e. spreading the process over multiple task windows) may be utilized to prevent the sudden interruption of the process.

Figure 2:
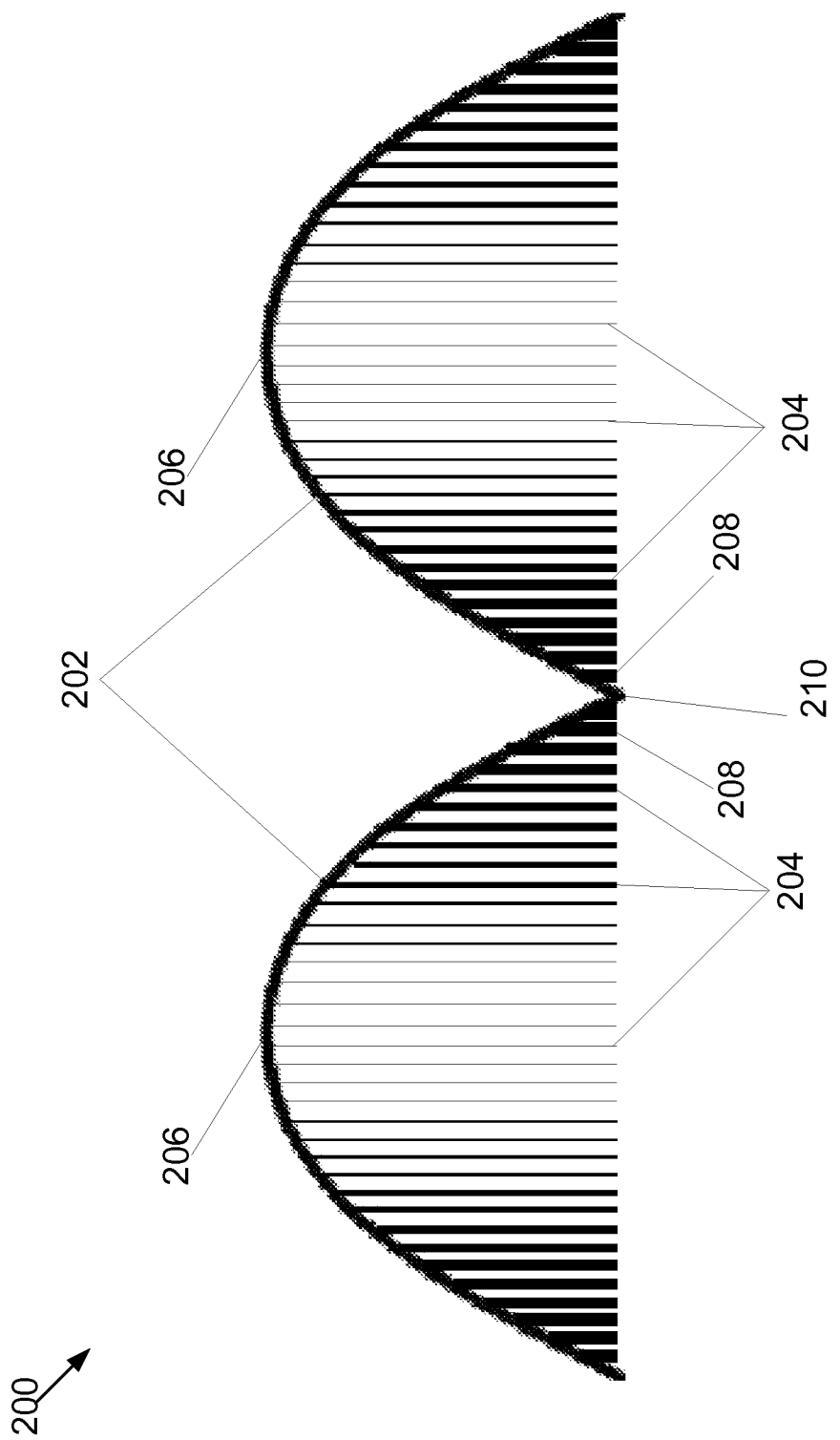
FIG. 2 is a graph illustrating a rectified signal and corresponding voltage pulses in accordance with aspects of the present invention.

FIG. 2 is a graph 200 illustrating one embodiment of the rectified power 202 received by the switch 106 and voltage pulses 204 generated by the switch 106 from the rectified power 202 and provided to the inductor 112 to drive the inductor 112. The full-wave rectified power 202 is generated by the bridge rectifier 104 from an AC signal received from the AC line input 101 and provided to the switch 106.

As the switch 106 is opened and closed rapidly, for example at 10 MHz or greater, portions of the rectified power 202 (i.e. voltage pulses 204) are provided to the inductor 112. Near the peak 206 of the rectified power 202, the voltage pulses 204 are at their narrowest width as the rectified power 202 is at its greatest magnitude and only a small portion of the rectified power 202 is necessary to drive the inductor 112 to provide the necessary power to the processor 116. However, as the rectified power 202 moves towards its minimum value 208 (i.e. towards a zero-crossing 210); the voltage pulses 204 become wider as the rectified power 202 moves to zero and a larger portion of the rectified power 202 is required to drive the inductor 112 to provide the necessary power to the processor 116.

The processor 116 monitors the rectified power 202 for approaching zero-crossings via the zero crossing flag line 114 as discussed above. At the zero crossing 210, the voltage pulses 204 go to zero as the rectified power 202 also goes to zero. Therefore, as a zero-crossing 210 approaches the processor transitions to standby mode and is maintained in standby mode by power previously stored on the output capacitor 110 and the inductor 112. When the processor 116 determines that the zero-crossing window has passed, the processor 116 transitions back to active mode and is powered by the inductor 112 which is again driven by the voltage pulses 204.

Figure 3:
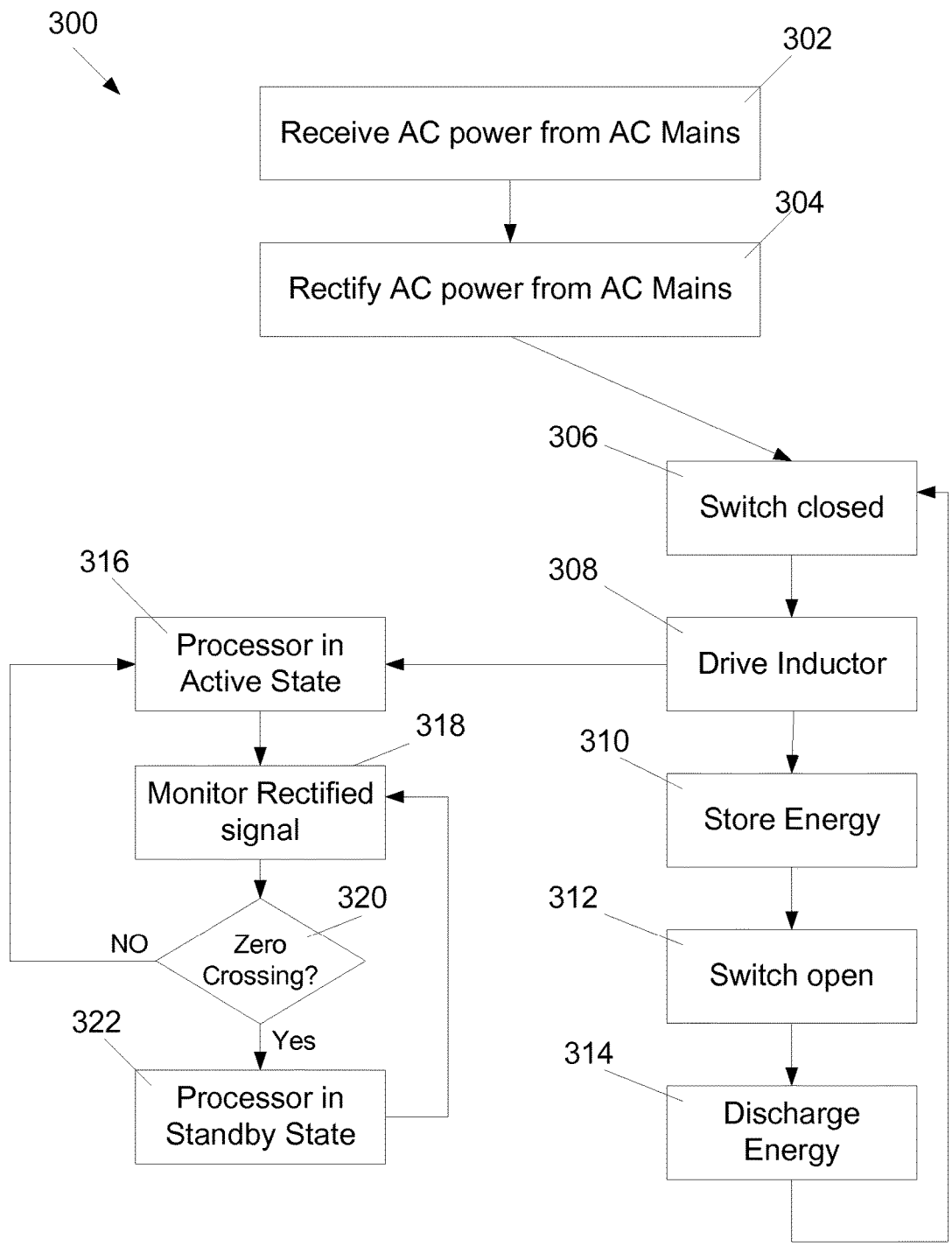
FIG. 3 is a flow chart illustrating a process for providing low DC supply voltage from AC mains in accordance with aspects of the present invention.

FIG. 3 is a flow chart illustrating a process 300 for providing a low supply voltage from AC mains with the power supply system 102. At block 302, the power supply system 102 receives AC power from the AC line input 101 and the neutral line input 103. At block 304, the full-bridge rectifier 104 rectifies the received AC power and generates full-wave rectified AC power.

At block 306, the switch 106 is closed and a portion of the full-wave rectified AC power (i.e. a voltage pulse) is provided to the inductor 112. At block 308, the inductor 112 is driven by the portion of the rectified power received from the switch 106 to provide a voltage to the processor 116. At substantially the same time, at block 310, the inductor 112 is also driven by the portion of the rectified power received from the switch 106 to provide a voltage to the output capacitor 110, thereby charging the output capacitor 110.

At block 312, the switch 106 is opened and the voltage pulse provided to the inductor 112 goes to zero. At block 314, the energy stored on the inductor 112 and the output capacitor 110 is provided to the processor 116. At block 306, the switch 106 is again closed. As discussed above, the switching frequency of the regulator is relatively high such that blocks 306 to 314 are performed relatively quickly so as to avoid saturation of the relatively small inductor 112 and so that the inductor 112 provides the appropriate level of voltage to the processor 116.

At block 316, once the inductor 112 is driven to provide power to the processor 116, the processor is powered into an active state. At block 318, while being powered by voltage from the inductor 112, the processor 115 monitors the rectified power at the switch 106. At block 320, a determination is made whether a zero-crossing of the rectified power is approaching. In response to a determination that a zero-crossing is not present, at block 316 the processor 116 remains in the active state and at block 318 continues to monitor the rectified power for approaching zero-crossings. In response to the identification of an approaching zero-crossing, at block 322 the processor 116 enters a standby (or sleep) state. As discussed above, during the standby state, the lower power requirements of the processor are met by the output capacitor 110 and the inductor 112. Also during the standby state, certain processor tasks which cannot be interrupted are put on hold until the zero-crossing window has passed.

At block 320, a determination is made whether a zero-crossing window of the rectified power has passed. In response to a determination that a zero-crossing is not present, at block 316 the processor 116 transitions back to the active state and at block 318 continues to monitor the rectified power for zero-crossings. In response to a determination that a zero-crossing is still present, at blocks 318 and 320 the processor 116 is maintained in the standby state and continues to monitor the rectified power for the end of the zero-crossing window.

According to one embodiment, due to the elimination of the input capacitor and the reduction in size of other components (e.g., the output capacitor 110 and the inductor 112) within the power supply, the entire power supply system 102 is integrated onto a single chip. In another embodiment, due the reduced size of the power supply system 102, the power supply system 102 is combined with other application-specific circuitry onto a single chip. For example, the power supply system 102 and additional application-specific circuitry (e.g., linear hall-effect current sensors, voltage measurement, power switches, digital hall-effect sensors, antennas, etc.) may all be included within a single chip of a "Smart Outlet."

As described herein, the switch 106 is a high speed, high voltage switch; however, in other embodiments, any type of switch 106 capable of driving the inductor 112 to provide the appropriate level of voltage to the processor 116 may be utilized.

As also described herein, the power supply system 102 is described in relation to intelligent power products; however, in other embodiments, the power supply system 102 may be utilized wherever a power supply is desired to supply a device with a low voltage from AC mains.

As described herein, the power supply system 102 includes a bridge rectifier 104 capable of full-wave rectification; however, in other embodiments, any other type of rectifier (e.g., a half-wave rectifier) may be utilized and the processor may be configured to account for the corresponding zero-crossing and task windows.

As described herein, the power supply system 102 provides low level power to a processor; however, in other embodiments, the power supply system 102 may be configured to provide low level power to any low power device.

As also described herein, the control circuitry of the power supply system 102 includes the processor 116 and the switch controller 107; however, in other embodiments, the control circuitry of the power supply system 102 may only include the processor 116. In such an embodiment, the processor 116 would control the switch 106, rather than the switch controller 107, to drive the inductor 112 to provide the appropriate voltage to the processor 116.

As described herein, by utilizing a switch to drive an inductor, the power supply system 102 is able to drop a high AC mains input voltage down to a relatively low voltage supply level, absent the use of a large input capacitor. In addition, by utilizing a low duty cycle switching regulator (e.g. 5%), the size of certain components (e.g., the output capacitor and the inductor) within the power supply system 102 may be reduced. Finally, by having a processor coupled to the power supply system 102 enter standby mode upon detecting an approaching zero-crossing, the power supply system 102 may be able to prevent processor task interruption due to reduced energy storage capacity.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power supply system comprising:
an input line configured to receive input AC power;
a rectifier having an input coupled to the input line and an output, the rectifier configured to rectify the input AC power to generate rectified AC power;
a switch having a first end coupled to the output of the rectifier and a second end selectively coupled to an inductor, the switch configured to receive the rectified AC power from the rectifier;
a capacitor coupled to the inductor; and
control circuitry coupled to the inductor and the capacitor, wherein the control circuitry is configured to:
control the switch to selectively couple the output of the rectifier to the inductor to generate a first DC power level derived from the rectified AC power;
monitor the rectified AC power received by the switch;
operate in a first mode of operation while receiving the first DC power level;
determine a phase angle value corresponding to zero crossings of the rectified AC power received by the switch;
detect that a phase angle of the rectified AC power received by the switch is equal to the phase angle value; and transition into a second mode of operation in response to detection of the phase angle being equal to the phase angle value.

2. The power supply system of claim 1, wherein the control circuitry is further configured to operate in the second mode of operation while receiving a second DC power level from the capacitor.

3. The power supply system of claim 2, wherein the first mode of operation is an active mode of operation and the second mode of operation is a standby mode of operation, and wherein the first DC power level is greater than the second DC power level.

4. The power supply system of claim 3, wherein the control circuitry includes a processor coupled to the inductor and the capacitor and a controller coupled to the switch and the capacitor.

5. The power supply system of claim 4, wherein the processor is configured to place selected processor tasks on hold in the standby mode of operation.

6. The power supply system of claim 4, wherein the switch is controlled by the controller to selectively couple the output of the rectifier to the inductor to provide voltage pulses to the inductor.

7. The power supply system of claim 4, further comprising a zero-crossing flag line coupled to the processor.

8. The power supply system of claim 1, wherein the switch is a Field Effect Transistor.

9. The power supply system of claim 1, wherein the switch is operated by the control circuitry at a switching frequency in the range of 5 MHz-20 MHz.

10. The power supply system of claim 1, wherein the inductor has a value in the range of 10 uH-500 uH.

11. The power supply system of claim 1, wherein the capacitor has a value in the range of 1 nF to 10 µF.

12. The power supply system of claim 1, wherein the rectifier, switch, inductor, and control circuitry are integrated within a single chip.

13. A method for providing DC power to a processor coupled to an AC input line, the method comprising:
receiving, with the AC input line, input AC power from an AC power source coupled to the AC input line;
rectifying, with a rectifier coupled to the AC input line, the input AC power to generate rectified AC power;
generating a first DC power level from the rectified AC power by selectively coupling the rectified AC power to an inductor;
providing the first DC power level to a capacitor and the processor and operating the processor in a first mode of operation;
monitoring the rectified AC power output by the rectifier;
determining a phase angle value corresponding to zero crossings of the rectified AC power output by the rectifier;
detecting that a phase angle of the rectified AC power output by the rectifier is equal to the phase angle value; and
transitioning the processor into a second mode of operation in response to detection of the phase angle being equal to the phase angle value.

14. The method of claim 13, wherein transitioning the processor into a second mode of operation includes transitioning the processor into a standby mode of operation and discharging the capacitor to provide, in the second mode of operation, a second DC power level to the processor which is less than the first DC power level.

15. The method of claim 14, further comprising placing selected processor tasks on hold while the processor is in the standby mode of operation.

16. The method of claim 13, wherein detecting includes monitoring a zero crossing flag line coupled to the processor and determining a zero-crossing window corresponding to a phase angle range of the rectified AC power that includes a phase angle at which the rectified AC power has a zero voltage value.

17. The method of claim 16, further comprising transitioning the processor into the first mode of operation in response to a determination that the zero-crossing window has passed.

18. The method of claim 13, wherein generating includes selectively coupling the rectified AC power to the inductor using a control signal having a fixed frequency and a duty cycle that varies with variations in the phase angle.

19. The method of claim 18, wherein selectively coupling the rectified AC power to the inductor includes controlling the switch using the control signal to provide voltage pulses to the inductor from the rectified AC power.

20. A processor system comprising:
an input line configured to receive input AC power, the input AC power having a cyclical waveform; and
a processor configured to operate from DC power derived from the input AC power, monitor rectified AC power derived from the input AC power, determine a phase angle range of an approaching zero crossing window of the waveform, detect a phase angle of rectified AC power derived from the input AC power, and control the processor to operate in a first mode of operation in response to detecting that the phase angle of the rectified AC power is outside of the phase angle range, and to operate in a second mode of operation in response to detecting that the phase angle of the rectified AC power is within the phase angle range.

* * * * *